United States Patent
Jonsson et al.

(10) Patent No.: US 8,424,488 B2
(45) Date of Patent: Apr. 23, 2013

(54) SYSTEM FOR MANAGING THE SUPPLY OF CONSUMABLE MATTER TO BE CONSUMED BY MILK PRODUCING ANIMALS

(75) Inventors: Magnus Jonsson, Nora (SE); Pierre De Villiers, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 824 days.

(21) Appl. No.: 12/446,344

(22) PCT Filed: Oct. 12, 2007

(86) PCT No.: PCT/SE2007/050735
§ 371 (c)(1),
(2), (4) Date: Nov. 20, 2009

(87) PCT Pub. No.: WO2008/048180
PCT Pub. Date: Apr. 24, 2008

(65) Prior Publication Data
US 2010/0154714 A1     Jun. 24, 2010

(30) Foreign Application Priority Data
Oct. 20, 2006 (SE) ........................... 0602209

(51) Int. Cl.
*A01J 5/00* (2006.01)
*A01J 5/007* (2006.01)

(52) U.S. Cl.
USPC ..................... 119/14.08; 199/14.18

(58) Field of Classification Search ............... 119/14.08, 119/14.17, 14.18, 51.02
See application file for complete search history.

(56) References Cited

U.S. PATENT DOCUMENTS

| 4,517,923 | A | | 5/1985 | Palmer | |
|---|---|---|---|---|---|
| 4,532,892 | A | * | 8/1985 | Kuzara | 119/51.02 |
| 4,655,170 | A | * | 4/1987 | DaSilva | 119/51.02 |
| 4,712,511 | A | | 12/1987 | Zamzow et al. | |
| 5,778,820 | A | * | 7/1998 | van der Lely et al. | 119/14.18 |
| 5,873,323 | A | * | 2/1999 | van den Berg et al. | 119/14.02 |

(Continued)

FOREIGN PATENT DOCUMENTS

| EP | 0 067 960 | 12/1982 |
|---|---|---|
| EP | 1 260 136 | 11/2002 |

(Continued)

OTHER PUBLICATIONS

Extended European Search Report, dated May 30, 2012, from corresponding EP application No. EP 07 83 5320.

(Continued)

*Primary Examiner* — Rob Swiatek
*Assistant Examiner* — Kathleen Iwasaki
(74) *Attorney, Agent, or Firm* — Young & Thompson

(57) ABSTRACT

A system for managing the supply of consumable matter to be consumed by milk producing animals includes a supply arrangement (24, 26, 28, 34, 36, 38) for supplying consumable matter to a feeding trough (14) from which the animal (12) can eat and/or drink, and a control unit (30) which controls the supply of the consumable matter to the feeding trough (14). The system also has an analysis device (40) adapted to analyse the milk from an individual milked animal (12) with regard to at least one property of the milk. The control unit (30) is arranged to receive information from the analysis device (40) and to automatically control the composition of the consumable matter supplied to the feeding trough (14) in dependence on the information received from the analysis device (40).

20 Claims, 2 Drawing Sheets

U.S. PATENT DOCUMENTS

| | | | |
|---|---|---|---|
| 6,263,832 B1 * | 7/2001 | van den Berg | 119/14.08 |
| 6,651,585 B2 * | 11/2003 | van den Berg | 119/51.02 |
| 6,814,025 B2 * | 11/2004 | Chen et al. | 119/14.01 |
| 2002/0124803 A1 | 9/2002 | Chen et al. | |
| 2010/0170445 A1 * | 7/2010 | Gerrit | 119/14.02 |

FOREIGN PATENT DOCUMENTS

| | | |
|---|---|---|
| EP | 1300075 A2 | 4/2003 |
| GB | 1 190 432 | 5/1970 |
| JP | 2009112207 A * | 5/2009 |
| WO | 0247473 A2 | 6/2002 |
| WO | 02/069697 | 9/2002 |
| WO | 2005067704 A1 | 7/2005 |

OTHER PUBLICATIONS

Observation by a third party, dated Nov. 5, 2009, filed in the corresponding EP application No. EP 07 83 5320.

International Search Report dated Jan. 18, 2008, from corresponding PCT application.

* cited by examiner

SYSTEM FOR MANAGING THE SUPPLY OF CONSUMABLE MATTER TO BE CONSUMED BY MILK PRODUCING ANIMALS

BACKGROUND OF THE INVENTION AND PRIOR ART

The present invention relates to a system for managing the supply of consumable matter to be consumed by milk producing animals. The system comprises a supply arrangement for supplying consumable matter to a feeding trough from which the animal can eat and/or drink, and a control unit which controls the supply of the consumable matter to the feeding trough.

Different systems for managing the supply of consumable matter to milk producing animals are known. EP-A1-0 067 960 describes such a system. The consumable matter is in this case supplied to the animal in liquid form. The matter to be supplied to the animal in this case is milk. The described system also includes means for supplying additional matter to the milk. The additional matter can for example be a medicament. The system is controlled by a programmable device.

EP 1 260 136 B1 describes a device for supplying feed to and animal. In addition to the normal feed supply, the device includes means for supplying liquid to a feeding trough. The liquid can contain additives such as medicaments, vitamins, salts or minerals.

It is also well known that milk producing animals may suffer from different illnesses, such as ketosis and/or milk fever and/or mastitis.

Although the present invention is applicable to different species of milk producing animals, it will for the sake of simplicity often be referred to cows in the rest of this document.

In particular, the cow is prone to such illnesses (in particular ketosis or milk fever) near before and after the time of calving. There are different methods of diagnosing such illnesses. For example, the presence of certain ketone bodies in the blood or in the milk from the cow is an indication that ketosis may be the case. The above and other illnesses constitute a health risk for the cow. Furthermore, such illnesses cause a loss in milk yield and increase the veterinary costs.

SUMMARY OF THE INVENTION

An object of the present invention is to provide a system for automatically detecting and treating different unwanted physiological states in milk producing animals. A further object is to provide a system that carries out this task automatically at an early stage, i.e. before the symptoms have become severe. It is thereby an object to be able to prevent illnesses in milk producing animals by automatically treating early signs that could lead to such illnesses. The invention is also applicable to treat certain states of a milk producing animal that, although not necessarily connected with an illness, may negatively effect the health state or the milk producing capacity of the animal.

The above objects are achieved by a system of the kind described in the first paragraph above and which is further characterised by an analysis device adapted to analyse the milk from an individual milked animal with regard to at least one property of said milk, wherein the control unit is arranged to receive information from the analysis device, and wherein the control unit is adapted to automatically control the composition of the consumable matter supplied to the feeding trough in dependence on the information received from the analysis device.

It should be noted that the system is with advantage arranged such that the milk from the milked animal is automatically analysed.

It should also be noted that the concept "consumable matter" as used herein refers to matter that is to be eaten or drunk by the animal.

The system according to the invention is thus arranged to analyse milk from an individually milked animal. Through this analysis, it is possible to detect certain unwanted states of the animal, for example an indication of the fact that the animal risks getting ill. The unwanted state of the animal can then be automatically treated by controlling the composition of the consumable matter supplied to the animal. In this manner, it is possible to prevent or to treat different illnesses or other unwanted states. By analysing the milk, it is for example possible to determine weather certain additives should be added to the consumable matter supplied to the animal.

It can be noted that instead of "consumable matter" the concept "feedstuff" is also used below. The feedstuff can be in a dry or a liquid state.

It should be noted that devices for analysing different constituents of milk are already known. For example, WO 02/069697 A1 describes a system that includes a chemical analysis equipment for analysing milk samples.

According to an embodiment of the system according to the invention, the system is adapted for identifying an animal at a milking position. The animal can either be identified before it reaches the milking position or when it is actually standing at the milking position. Furthermore, the system can also be adapted for identifying an animal at a feeding position, wherein said feeding position can be the same position as the milking position or a different position. Similarly to the explanation above in connection with the milking position, the animal can either be identified before it reaches the actual feeding position or when it is actually standing at the feeding position. When in this document it is said that an animal is identified at a milking or feeding position, it is thus meant that the animal is identified before it reaches the position in question or at the position in question, such that the identity of the animal at the position in question is known. By identifying the animal at a milking position, it is possible to know the identity of the animal from which the milk sample that is analysed originates. By also identifying the animal at a feeding position, it is possible to make sure that the identified animal receives the correct composition of the feedstuff.

It should be noted that the expression "milking position" as used herein refers to a position adapted for milking an animal. At the milking position is thus arranged a milking equipment, which can be either a milking machine, where the teat cups are applied manually to the animal or which can include a milking robot which automatically carries out the milking procedure. Typically, the milking position is a milking position in a stationary or rotary parlour. The animal can receive feedstuff at the milking position. In this case, the milking position thus also constitutes a feeding position. However, it is also possible to supply the feedstuff at a separate feeding position where milking does not take place.

According to a further embodiment, the control unit is arranged to store information relating to the analysis of milk from an identified animal and to, in dependence on the stored information, control the composition of the consumable matter supplied to a feeding trough when it has been identified that the animal in question is in the feeding position where the feeding trough in question is located. The control unit thus preferably comprises a memory in which information relating to a certain animal is stored. It is thereby possible to supply the correct composition of the feedstuff to the animal at a later occasion than when the milk sample from the animal in question was analysed.

The control unit can be arranged to control the composition of the consumable matter also in dependence on additional stored information relating to the identified animal, such as whether the identified animal is within a certain number of days before or after calving. It is thus, for example, possible to give additional feedstuff if a cow is within a certain number of days before or after calving and if also the analysis of the milk sample from the cow indicates that additional feedstuff should be supplied to the cow.

The analysis device is preferably adapted to sense at least one property of the milk with help of which it can be determined whether the animal, clinically or sub-clinically, is likely to suffer from ketosis.

The analysis device can also be adapted to sense at least one property of the milk with help of which it can be determined whether the animal, clinically or sub-clinically, is likely to suffer from milk fever. Although, the invention could be used for analysing several different states of an animal, the invention has appeared to be particularly useful for analysing a state of ketosis and/or milk fever. Another possibility is to analyse the milk for indicating a state of mastitis.

The analysis device can for example be adapted to sense one or more of the following constituents: acetone, acetoacetate, betahydroxybutyrate, lactose, lactate dehydrogenase and/or to perform a somatic cell count and/or to measure the temperature of the milk. The mentioned constituents and the somatic cell count can be used to indicate an early stage of for example ketosis or mastitis. It has appeared to be particularly useful to analyse the presence of betahydroxybutyrate in the milk sample. The level of this constituent can be used to indicate ketosis. An increased temperature of the milk can be an indication of milk fever.

With advantage, the control unit can be adapted to serve a plurality of milking positions. Although there could be different control units for the different milking positions, it is advantageous to use a common control unit for different milking positions.

According to an embodiment, the analysis device is adapted to be common to a plurality of milking positions, and wherein the system is arranged such that the analysis device is adapted to receive individual milk samples from the different milking positions. Although there could be different analysis devices, it is advantageous if one analysis device is used for analysing milk samples from the different milking positions. Furthermore, although not necessary, it is preferred that the analysis device automatically receives the milk samples, and automatically carries out the analysis.

According to a further embodiment, the supply arrangement comprises a first matter supply means for supplying consumable matter to a feeding trough at a certain feeding position, wherein the supply arrangement also comprises an additional matter supply means for supplying consumable matter of a different composition, than that supplied by the first matter supply means, to that feeding trough, wherein the control unit is adapted to automatically control the composition of the consumable matter by controlling the supply of consumable matter via said first and additional matter supply means. If the supply arrangement includes two such supply means, it is easy to control the composition of the consumable matter by controlling the amount of matter supplied by the two different supply means.

With advantage, the additional matter supply means can be adapted to supply consumable matter in a liquid state to the feeding trough. It is advantageous if the additional matter supply means is adapted to supply consumable matter in a liquid state. Such matter could for example be sprayed over the consumable matter supplied by the first matter supply means. However, alternatively, the additional matter supply means can be adapted to supply consumable matter in a dry state, for example as a powder.

According to a further embodiment, the system comprises a container for containing consumable matter, wherein said additional matter supply means is connected to said container such that consumable matter can be supplied to the feeding trough from said container. It is convenient to arrange the consumable matter to be supplied by the additional matter supply means in a container.

The system can comprise a plurality of feeding positions, wherein the supply arrangement comprises additional matter supply means leading to each of said plurality of feeding positions. In this manner, consumable matter can be supplied to different feeding positions by additional matter supply means leading to the different feeding positions.

The mentioned container can be common for said plurality of feeding positions, such that the control unit can control the supply of consumable matter from said container to each of said plurality of feeding positions. Instead of having different containers for different feeding positions, it is thus possible to have a common container from which consumable matter can be supplied to the different feeding positions.

According to a further embodiment, the container contains a feed additive that, for example, includes propylene glycol and/or calcium, and/or niacin and/or vitamin E and/or selenium. It is convenient if the container contains a suitable feed additive. Such a feed additive can be added to the normal feedstuff that is provided to an animal, in order to prevent different illnesses or other unwanted states of an animal. It should be noted, that according to one possible embodiment, the container contains different compartments for the different additives (or, alternatively, there can be different containers for the different additives), such that the control unit can control the composition of the different additives. However, it is also possible that the container only contains one compartment where a suitable additive, or a mixture of additives, is present.

With advantage, the control unit is arranged to determine whether at least one property of the milk sample, for example the amount of one or more milk constituents, analysed by the analysis device, of an identified animal, fulfils a predetermined criterion and to control the supply of feed additive to a feeding position, where the animal in question has been identified as being present, in dependence on this determination. The system can thus be arranged to automatically supply a feed additive to a certain animal in response to the analysis (which is also preferably performed automatically) of the analysis device.

According to a preferred embodiment, the control unit is arranged to determine whether the amount of beta-hydroxybutyrate is above a certain level and, if this is the case, to supply a certain amount of feed additive, optionally also under condition that one or more other criteria, stored in the control unit, are fulfilled. As mentioned above, it is advantageous to analyse the amount of beta-hydroxybutyrate in the milk. If the level of beta-hydroxybutyrate is above a certain level, it is advantageous to supply a feed additive to the animal, for example a feed additive that includes propylene glycol. The optional further criteria for supplying a feed additive can, for example, be that the additive is supplied only if the animal is within a certain number of days before or after calving. Of course, the optional conditions can include other criteria which, for example, can determine the amount of feed additive to be supplied to a certain animal.

Further advantageous aspects of the invention will become clear from the description below.

DESCRIPTION OF AN EMBODIMENT OF THE INVENTION

Figure 1:
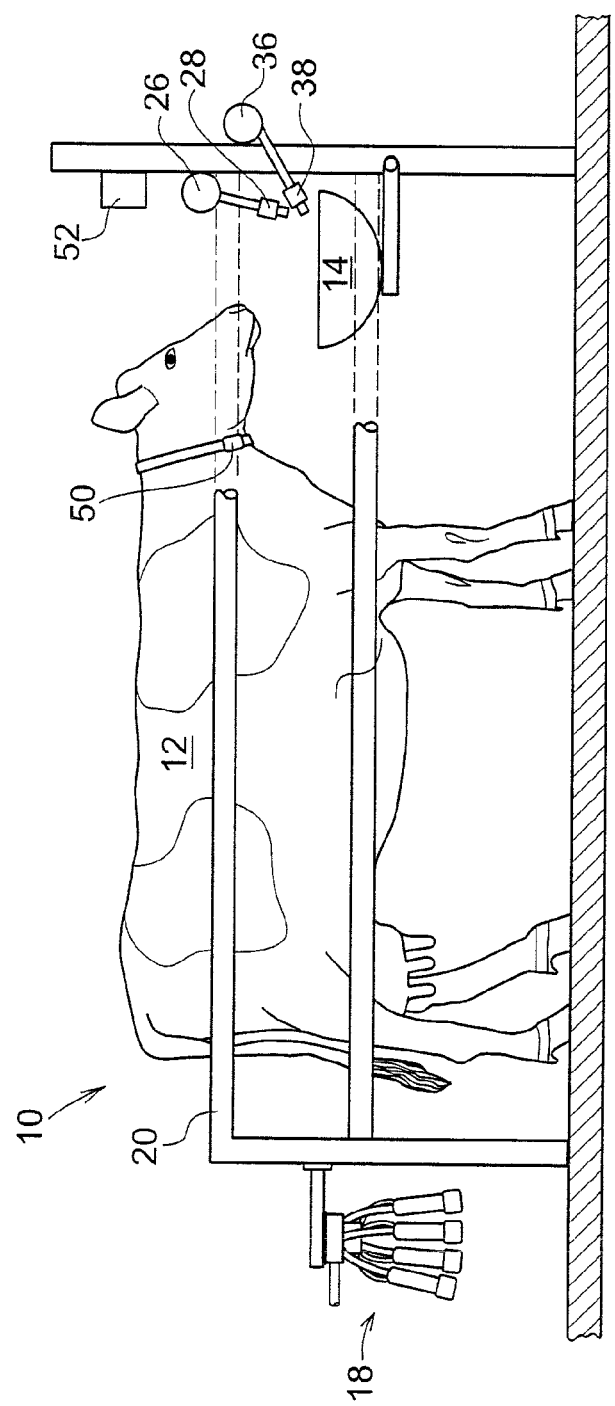
FIG. 1 shows schematically a cow at a milking/feeding position including parts of the system according to an embodiment of the invention.
Figure 2:
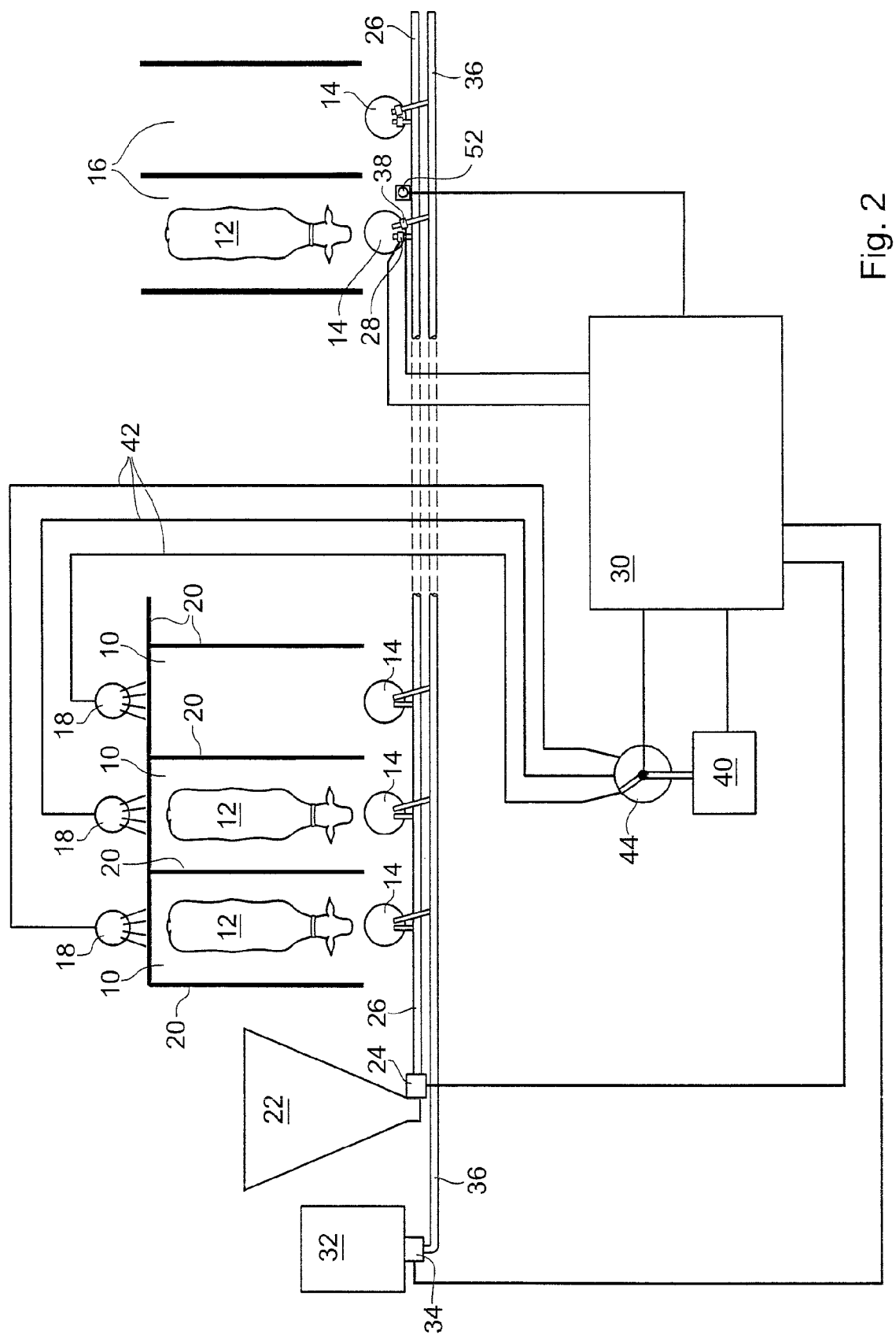
FIG. 2 shows schematically an embodiment of the system according to the invention.

FIG. 2 shows schematically an embodiment of a system according to the invention for managing the supply of feedstuff to milk producing animals. FIG. 1 shows schematically a milking position 10 with a cow 12. FIG. 2 illustrates three such milking positions 10. However, it is clear to a person skilled in the art that the system can include many more such milking positions 10. In the shown embodiment, the milking positions 10 are at the same time feeding positions, since, according to this embodiment, feedstuff can be supplied to troughs 14 located at the milking positions 10.

In addition to the milking positions 10, FIG. 2 shows two feeding positions 16 with troughs 14 to which feedstuff can be supplied. There can, of course, be several further such feeding positions 16.

The milking positions 10 include milking equipment 18 for milking the cows. It can be noted that the milking equipment 18 can either include a milking robot or can constitute equipment for manual attachment to the cow for milking. The milking positions 10 can include some partition or fence 20. The feeding positions 16 differ from the milking positions 10 in that the feeding positions 16 do not have any milking equipment 18.

When a cow is milked, milk is led from the milking equipment 18 to a milk tank (not shown) in a manner known to a person skilled in the art.

The system includes a supply arrangement for supplying feedstuff to the feeding troughs 14. The supply arrangement includes first matter supply means and additional matter supply means. The first matter supply means includes feeding means 24, a feed line 26 and first control means 28. A hopper 22 may for example contain normal feed concentrate. The feeding means 24 transports the feed concentrate to the different feeding troughs 14. The amount of feed concentrate supplied to the individual feeding troughs 14 is controlled by the first control means 28, which are connected to a central control unit 30. It is known to a person skilled in the art how to control the amount of feedstuff supplied to different feeding troughs 14.

The supply arrangement also comprises additional matter supply means. These means includes feeding means 34, a second feed line 36 and second control means 38. A container 32 contains feedstuff of a different composition than the feedstuff in the hopper 22. The container 32 may for example contain a feed additive including propylene glycol and calcium or other additives such as niacin, vitamin E and/or selenium.

According to a preferred embodiment of the invention, the feedstuff in the container 32 is in a liquid state. The feedstuff in the hopper 22 can be either in a dry state or in a liquid state. The feedstuff from the container 32 is fed to the different feeding troughs 14 with the help of the feeding means 34, which may be a pump. The amount of feedstuff from the container 32 that is supplied to the different feeding troughs 14 is controlled by the second control means 38. The second control means 38 are controlled by the control unit 30. The control unit 30 can thus be a computer that controls the operation of the system. It can be noted that for the sake of simplicity, in FIG. 2 the first control means 28 and the second control means 38 are only shown at one feeding trough 14. However, such control means 28, 38 are arranged at all the feeding troughs 14.

In the shown embodiment there is one hopper 22 that is common to the different feeding positions 10, 16. There is also one container 32 that is common to the different feeding positions 10, 16. However, it is within the scope of the invention that there are separate hoppers 22 and containers 32 for the different feeding positions 10, 16. Furthermore, even if there is a common hopper 22 or container 32, it is not necessary that there are common feed lines 26, 36 to the different feeding positions 10, 16. It is also possible that there are separate feed lines 26, 36 leading to the different feeding troughs 14. The feed lines 26, 36 are preferably formed by tubes. It is also possible that there are different containers 32 for different additives, such that the control unit 30 can control the supply of different additives (or different mixtures of additives) to the different milking or feeding positions 10, 16.

The system also includes an analysis device 40 for analysing milk from an individual milked cow. In order to achieve this, the system includes tubes 42 for feeding milk from the individual milking positions 10 to the analysis device 40. In the shown embodiment, there is one analysis device 40 for all the milking positions 10. Therefore, the system includes switching means 44 which makes it possible to enter milk samples from different milking positions 10 to the analysis device 40. The switching means 44 is controlled by the control unit 30. Also the analysis device 40 is connected to the control unit 30.

The analysis device 40 is set up to analyse at least one property of the milk. The analysis device 40 can thus be set up to analyse a milk property, for example a milk constituent such that it can be determined whether the cow in question, clinically or sub-clinically, is likely to suffer from ketosis or milk fever or mastitis. The analysis device 40 can for example be adapted to sense one or more of the following constituents: acetone, acetoacetate, betahydroxybutyrate, lactose, lactate dehydrogenase or to perform a somatic cell count or to measure the temperature of the milk. Preferably, the analysis device 40 is set up to analyse the content of beta-hydroxybutyrate in the milk sample. It can be noted that an analysis device 40 is known as such, for example from WO 02/069697 A1. However, the analysis device 40 can also be of a different construction than shown in the mentioned document.

The system also includes means for identifying the different cows at the milking and feeding positions 10, 16. How this is done is known to a person skilled in the art. The cow may for example carry a transponder 50. At each milking/feeding position 10, 16 there is located a transmitter/receiver device 52, which is connected to the control unit 30 and with the help of which the transponder 50, and thereby the cow, can be identified. Alternatively, as mentioned above, the cow can be identified before it actually reaches the milking/feeding position 10, 16.

It should be noted that for the sake of simplicity FIG. 2 only shows such a transmitter/receiver device 52 at one feeding position 16.

In the control unit 30 there is stored information relating to the different cows 12. Such information may for example include information concerning the (expected) date of calving.

The function of an embodiment of the system will now be described more closely.

The cows 12 are milked at the milking positions 10. The individual cows 12 are thereby identified with the help of the transmitter/receiver device 52, the transponder 50 and the control unit 30. At certain times, that can be controlled by the control unit 30, a milk sample is conveyed from the milking equipment 18 of the identified cow 12 to the analysis device 40. The analysis device 40 analyses the milk from the individual cow 12, for example with regard to the content of beta-hydroxybutyrate. The result of the analysis is stored in the control unit 30. At the milking positions 10 and/or at the feeding positions 16, the cow 12 can consume feedstuff from the feeding troughs 14. The feedstuff includes normal feed concentrate supplied from the hopper 22. The amount of this feed concentrate is controlled by the control unit 30 in a known manner, by controlling the first control means 28, when the identified cow 12 is at a feeding position 10, 16.

Depending on the analysis performed by the analysis device 40, the individual cow 12 can be provided with additional consumable matter, such as propylene glycol and/or calcium and/or niacin and/or vitamin E and/or selenium, from the container 32. The feedstuff from the container 32 is preferably in a liquid state. If it is determined by the control unit 30 that the level of for example betahydroxibutyrate in the milk sample is above a certain level, then it is decided to add feedstuff from the container 32 to the cow 12 in question. The decision whether the cow 12 should receive such additional feedstuff may also depend on other conditions, such as whether the cow 12 is close to the expected time for calving or whether the cow 12 is in a stage of early lactation. Depending of the result of the analysis in the analysis device 40 and possible further conditions, the control unit 30 can thus automatically decide to supply additional feedstuff from the container 32 to the cow 12 in question. This additional feedstuff can be supplied when the cow 12 is at the milking position 10 (for example at the subsequent time the cow 12 is being milked) or at a feeding position 16. The amount of feedstuff supplied from the container 32 to the individual cow 12 is controlled with the help of the control unit 30 and the second control means 38. With the help of the second control means 38, the feedstuff from the container 32 can for example be sprayed over the feedstuff from the hopper 22.

The control unit 30 thus automatically controls the composition of the feedstuff delivered to a certain cow 12 in dependence on information received from the analysis device 40 (and possible further conditions). In this manner, it is possible to control for example the amount of feed additive supplied from the container 32 in order to prevent the occurrence of illnesses, such as ketosis or milk fever or mastitis, or other unwanted states of the animal.

The invention is not limited to the described embodiment, but can be varied and modified within the scope of the claims.

The invention claimed is:

1. A system for managing a supply of consumable matter to be consumed by milk producing animals, the system comprising:
a supply arrangement for supplying consumable matter to a feeding trough from which an animal can eat and/or drink;
a control unit that automatically controls the supply of consumable matter to the feeding trough; and
an analysis device that automatically analyzes milk from the animal with regard to at least one property of said milk and determines from said at least one property whether the animal is at risk of becoming ill, the control unit automatically receiving information from the analysis device,
wherein the supply arrangement comprises i) a first matter supply means for supplying a first consumable matter to the feeding trough, and ii) a second matter supply means for supplying, to the feeding trough, a second consumable matter different from the first consumable matter, and
wherein the control unit automatically controls a composition of the consumable matter supplied to the feeding trough by controlling a supply of the first consumable matter via said first matter supply means, and controlling a supply of the second consumable matter via the second matter supply means such that, upon a determination by the analysis device that the animal is at risk of becoming ill, the second matter supply means is activated to provide an additive to the first consumable matter so that the composition of the consumable matter in the feeding trough prevents or mitigates an illness in the animal.

2. The system according to claim 1, wherein the system identifies the animal at a milking position.

3. The system according to claim 1, wherein the system identifies the animal at a feeding position.

4. The system according to claim 3, wherein the feeding position also milks the animal.

5. The system according to claim 3, wherein the control unit stores information relating to an analysis of the milk from the animal and, based on the stored information, controls the composition of the consumable matter supplied to the feeding trough upon a determination that the animal is in the feeding position where the feeding trough is located.

6. The system according to claim 1, wherein the control unit controls the composition of the consumable matter based also on stored information indicating whether the animal is within a predetermined number of days before or after calving.

7. The system according to claim 1, wherein said analysis device determines from said at least one property of the milk whether the animal is suffering from or at risk of ketosis.

8. The system according to claim 1, wherein said analysis device determines from said at least one property of the milk whether the animal is suffering from or at risk of milk fever.

9. The system according to claim 1, wherein said analysis device senses, in the milk of the animal, one or more of the group consisting of: acetone, acetoacetate, beta-hydroxybutyrate, lactose, and lactate dehydrogenase, and/or to perform a somatic cell count, and/or to measure a temperature of the milk.

10. The system according to claim 9, wherein said analysis device determines whether a level of beta-hydroxybutyrate in the milk of the animal is greater than a predetermined amount that indicates ketosis in the animal.

11. The system according to claim 9, wherein said analysis device determines whether the temperature of the milk of the animal is greater than a predetermined amount that indicates milk fever in the animal.

12. The system according to claim 9, wherein said analysis device determines whether the somatic cell count of the milk of the animal is greater than a predetermined amount that indicates either of ketosis or mastitis in the animal.

13. The system according to claim 1, wherein the control unit serves a plurality of milking positions.

14. The system according to claim 1,
wherein the analysis device is common to a plurality of milking positions, and
wherein the analysis device receives milk samples from each one of the milking positions.

15. The system according to claim 1, wherein said second matter supply means supplies consumable matter in a liquid state to the feeding trough.

16. The system according to claim 1, further comprising:
a plurality of feeding positions,
wherein the second matter supply means supplies the second consumable matter to each one of said feeding positions, and
wherein the control unit controls supply of the second consumable matter to each one of said plurality of feeding positions on an individual basis.

17. The system according to claim 16, wherein the control unit controls the supply of the second consumable matter to a feeding position of the plurality of feeding positions wherein the animal is present.

18. The system according to claim 1, wherein the additive includes any of the group consisting of: propylene glycol, calcium, niacin, vitamin E, and selenium.

19. The system according to claim 1, wherein the control unit automatically makes a determination whether an amount of beta-hydroxybutyrate in the milk of the animal is above a predetermined level stored by the control unit that indicates ketosis in the animal and, upon said determination being affirmative, supplies an amount of the additive via the second matter supply means, the additive comprising any of the group consisting of: propylene glycol, calcium, niacin, vitamin E, and selenium.

20. The system according to claim 1, wherein said second matter supply means supplies consumable matter in a powder form to the feeding trough.

* * * * *

UNITED STATES PATENT AND TRADEMARK OFFICE
CERTIFICATE OF CORRECTION

PATENT NO. : 8,424,488 B2  Page 1 of 1
APPLICATION NO. : 12/446344
DATED : April 23, 2013
INVENTOR(S) : Jonsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this
Eighth Day of September, 2015

Michelle K. Lee
*Director of the United States Patent and Trademark Office*